(12) United States Patent
Tsunashima et al.

(10) Patent No.: US 6,728,420 B2
(45) Date of Patent: Apr. 27, 2004

(54) IMAGE PROCESSING APPARATUS, IMAGE PROCESSING METHOD, RECORDING MEDIUM AND ITS PROGRAM

(75) Inventors: Tadaaki Tsunashima, Kanagawa (JP); Masashi Endo, Kanagawa (JP)

(73) Assignee: Konami Corporation, Tokyo (JP)

( * ) Notice: Subject to any disclaimer, the term of this patent is extended or adjusted under 35 U.S.C. 154(b) by 602 days.

(21) Appl. No.: 09/813,187

(22) Filed: Mar. 20, 2001

(65) Prior Publication Data

US 2001/0031101 A1 Oct. 18, 2001

(30) Foreign Application Priority Data

Mar. 23, 2000 (JP) ......................... 2000-082832

(51) Int. Cl.$^7$ .......................... G06K 9/20; A63F 13/00; G06T 13/00
(52) U.S. Cl. ..................... 382/282; 382/284; 463/31; 345/473
(58) Field of Search ................................. 382/274, 276, 382/282, 284, 290, 293; 463/1, 48, 2–8, 30–31, 43–44; 345/467, 770, 552, 177, 435, 418, 419, 592, 473; 348/185, 222.1; 353/98

(56) References Cited

U.S. PATENT DOCUMENTS

| | | | | |
|---|---|---|---|---|
| 5,262,856 A | * | 11/1993 | Lippman et al. | 375/240.12 |
| 5,639,151 A | * | 6/1997 | McNelley et al. | 353/98 |
| 5,761,401 A | * | 6/1998 | Kobayashi et al. | 345/630 |
| 5,999,161 A | * | 12/1999 | Kajimoto et al. | 345/24 |
| 6,017,272 A | * | 1/2000 | Rieder | 463/31 |
| 6,464,585 B1 | * | 10/2002 | Miyamoto et al. | 463/35 |
| 6,556,784 B2 | * | 4/2003 | Onuki | 396/52 |

OTHER PUBLICATIONS

Patent Abstracts of Japan Publication No. 10–105734, entitled Method and Device for Specular Surface Rendering, By Aono et al., published Apr. 24, 1998.
Patent Abstracts of Japan Publication No. 10–105734, entitled Method and Device for Specular Surface Rendering, By Aono et al., published Apr. 24, 1998.
Patent Abstracts of Japan Publication No. 10–187951, entitled image composing device and method, By Katsuhiro Miura et al., published Jul. 21, 1998.
Patent Abstracts of Japan Publication No. 05–342368, entitled Method and Device for Generating Three–Dimensional Picture, By Kawabata et al., published Dec. 24, 1993.
Patent Abstracts of Japan Publication No. 10–320590, entitled Composite Image Production Device and Method Therefor, By Satoru Kojima, published Dec. 4, 1998.

* cited by examiner

Primary Examiner—Bhavesh M. Mehta
Assistant Examiner—Kanji Patel
(74) Attorney, Agent, or Firm—Bachman & LaPointe, P.C.

(57) ABSTRACT

When a character having a reflection portion in which a background image is reflected is displayed together with the background, a highly real display can be achieved without creating an excessive load o the image processing apparatus. That is, sub-part images extracted from a part of the background is pasted on respective sub-reflection portions, and such a character image is displayed together with the background scene.

21 Claims, 7 Drawing Sheets

IMAGE PROCESSING APPARATUS, IMAGE PROCESSING METHOD, RECORDING MEDIUM AND ITS PROGRAM

CROSS-REFERENCE TO RELATED APPLICATIONS

This application is based upon and claims the benefit of priority from the prior Japanese Patent Application No. 2000-082832, filed Mar. 23, 2000, the entire contents of which are incorporated herein by reference.

BACKGROUND OF THE INVENTION

1. Field of the Invention

The present invention relates to an image processing technique applicable to, for example, a video game machine, and more specifically, to an image processing technique used to display, on a predetermined display device, a dynamic image including a background image showing a background scene and a character image displayed on the background image, which is an image of a particular character having in at least its part, a reflection portion on which the background is to be reflected.

2. Description of the Related Art

In an image processing apparatus applicable to, for example, a video game device, an background image of a certain background scene and a character image of a predetermined character to be displayed on the background scene are prepared, and a dynamic image synthesized by superimposing the latter on the former is displayed on a predetermined display device, thus making an entire scene, in many cases. Such background and character are selected appropriately in accordance with the contents of the game.

In the meantime, in the case where the character is, for example, a sphere having a surface processed into a mirror-finished, or a vehicle such as an automobile, there is, in some case, a reflection portion where the surrounding background is reflected in a part of the character. That is, in the case of the above-mentioned sphere, the whole outer surface serves as a reflection portion, and in the case of an automobile, the windows of the automobile, such as its front window and rear window are reflection portion.

In the case where a character image of a character having such a reflection portion is displayed on a display device, it is preferable as a matter of reality, that a character image of the character those reflection portion reflects the surrounding background image as it is so in reality, should be generated and displayed together with the background image on the display device.

However, it is excessively burdensome for an image processing apparatus to calculate one by one what sort of background image is reflected on a reflection portion, and thus determine an image to be reflected in the refection portion.

Therefore, conventionally, even in the case where a character having the above-explained reflection portion is to be displayed on a display device, such an image that reflects the surrounding background image is not shown in its reflection portion in many cases. Even if a certain reflection image is shown in the reflection portion, the best that can be done is a process that keeps on pasting a certain texture in the reflection portion at all times.

Although such a technique of pasting a predetermined texture selected from a plurality of types prepared in advance onto a reflection portion appropriately is used in order to emphasize the reality even for a little improvement of the scene, a smooth and natural motion cannot be expressed yet by with this technique and therefore it is not sufficient to pursue the reality.

SUMMARY OF THE INVENTION

The present invention has been proposed to solve the above-described drawback of the conventional technique, and its object is to provide an image processing technique capable of expressing a high-reality image in a reflection portion without applying an excessive load on the image processing apparatus device when a character having a reflection portion and a background scene are displayed on a display device.

In order to achieve the above-described object, the inventors of the present technique made intensive studies and have come to a technical conclusion that a highly real character image can be displayed at high efficiency if the background image is utilized since what is reflected on the reflection portion is a part of the background expressed by the background image present around the character image.

According to a first aspect of the present invention, there is provided an image processing method comprising the steps of: generating background image data of a background image; extracting part image data from the background image data, which corresponds to a part of the background image; generating base character image data of a desired character image including at least one reflection portion; generating composite character image data of the character image in which the part of the background image is pasted on the at least one reflection portion, using the base character image data and the extracted part image data; and generating dynamic image data according to the background image data and the composite character image data in order to display a dynamic image of the background image and the desired character image on a preset display.

There is a high possibility that what is displayed in the background scene image is originally reflected on the reflection portion. Therefore, the image expressed in the reflection portion by the method is highly real though it is not completely accurate. Further, the background image is originally necessary for displaying the dynamic image, and therefore if its part is cut out and pasted on some other part, which is a reflection portion, an excessive load is not created on the image processing apparatus by such an operation.

In the above-described method, the part of the background image is pasted on the reflection portion. Here, the part of the background image is directly pasted on the reflection portion as it is. It is further possible that the part of the background image is processed by vertical-to-horizontal-ratio conversion within such a range that it would not create an excessive load, and then the process part of the background image is pasted on the reflection portion.

It may be arranged that the composite character image data generating step includes a substep of executing at least one of coordinate inversion, brightness adjustment, and semitransparency processing, for the extracted part image data.

As the coordinate inversion is performed, it becomes difficult to recognize at sight that the image displayed in the reflection is simply a copy of the part of the background image, thereby improving its reality. As the brightness adjustment is performed, it becomes possible to improve the reality for displaying the reflecting image in the case of a reflection portion which has not very high reflectivity. As the semitransparency processing is performed, the reflection portion thus displayed shows a particular image drawn in advance to show its basic image of the original character is shown transparently under the part of the background image which shows the surrounding background, thereby achieving a high reality.

It may be arranged that the part of the background image positions above the desired character image on the displayed dynamic image.

It may be arranged that the desired character represents a three-dimensional shape, and the part of the background image positions in a direction of a normal vector of the at least one reflection portion.

It may be arranged that the desired character image includes a plurality of reflection portions, the part of the background image includes a plurality of sub-part images, and the composite character image data generating step generates composite character image data such that the plurality of sub-part images are pasted on the plurality of reflection portions respectively.

It may be arranged that the plurality of sub-part images may position above the plurality of reflection portions on the displayed dynamic image.

It may be arranged that the desired character represents a three-dimensional shape, and the plurality of sub-part images position in directions of normal vectors of the plurality of reflection portions respectively.

It may be arranged that a relative position relationship of the plurality of reflection portions coincides with a relative position relationship of the plurality of sub-part images on the displayed dynamic image.

It may be arranged that a correspondence between the plurality of reflection portions and the plurality of sub-part images is kept in accordance with a preset condition.

It may be arranged that the desired character image represents a vehicle.

It may be arranged that the vehicle includes a plurality of reflection portions, the part of the background image includes a plurality of sub-part images, and the composite character image data generating step generates composite character image data such that the plurality of sub-part images are pasted on the plurality of reflection portions respectively.

It may be arranged that the plurality of reflection portions correspond to windows of the vehicle.

It may be arranged that the windows comprise a front window, a rear window and left and right side windows.

It may be arranged that the plurality of sub-part images position above the plurality of reflection portions on the displayed dynamic image.

It may be arranged that the desired character represents a three-dimensional shape, and the plurality of sub-part images position in directions of normal vectors of the plurality of reflection portions respectively.

It may be arranged that a relative position relationship of the plurality of reflection portions coincides with a relative position relationship of the plurality of sub-part images on the displayed dynamic image.

It may be arranged that a correspondence between the plurality of reflection portions and the plurality of sub-part images is kept in accordance with a preset condition.

The correspondence between the plurality of reflection portions and the plurality of sub-part images may be set in any way. For example, the relative positions in the left-and-right direction of the sub-part images on the display device are made to match with the relative positions in the left-and-right direction of the sub-reflection portions on the display device.

More specifically, the sub-part image of the section situated on the leftmost side on the display device is pasted on the section situated on the leftmost one of the reflection portion, and then the rest of the sub-part images are pasted onto the rest of the reflection portions in the order such that the leftmost sub-image is pasted on the leftmost sub-reflection portion. With the above-described correspondence, when the background is displayed to show different portions on right and left directions on the display, the sub-part images pasted on the reflection portions do not very much part from reality. Thus, a dynamic image of a high reality can be achieved.

The correspondence between the plurality of reflection portions and the plurality of sub-part images can be kept at all times. With the above-described correspondence, a character image can be displayed at high reality, however when each time the character changes its direction, the positional correlations between the reflection portions change. Accordingly the relations between reflection portions and sub-part images change as well. It is laborious for the apparatus to grasp such a change in the correlations, and it may create an excessive load on the apparatus in some cases. In order to avoid this, the correlations between the reflection portions and the sub-part images are kept constant, thus making it possible to suppress the load on the apparatus to a very low level.

According to a second aspect of the present invention, there is provided an image processing apparatus comprising: a first generator for generating background image data of a background image; an extractor for extracting part image data from the background image data, which corresponds to a part of the background image; a second generator for generating base character image data of a desired character image including at least one reflection portion, and generating composite character image data of the character image in which the part of the background image is pasted on the at least one reflection portion, using the base character image data and the extracted part image data; and a third generator for generating dynamic image data according to the background image data and the composite character image data in order to display a dynamic image of the background image and the desired character image on a preset display.

According to a third aspect of the present invention, there is provided a storage medium having computer readable program code means embodied in the medium, the computer readable program code means comprising: computer readable program code means for generating background image data of a background image; computer readable program code means for extracting part image data from the background image data, which corresponds to a part of the background image; computer readable program code means for generating base character image data of a desired character image including at least one reflection portion; computer readable program code means for generating composite character image data of the character image in which the part of the background image is pasted on the at least one reflection portion, using the base character image data and the extracted part image data; and computer readable program code means for generating dynamic image data according to the background image data and the composite character image data in order to display a dynamic image of the background image and the desired character image on a preset display.

According to a fourth aspect of the present invention, there is provided a computer program operational on a computer, comprising the steps of: generating background image data of a background image; extracting part image data from the background image data, which corresponds to a part of the background image; generating base character image data of a desired character image including at least one reflection portion; generating composite character image data of the character image in which the part of the background image is pasted on the at least one reflection portion, using the base character image data and the extracted part image data; and generating dynamic image data according to the background image data and the composite character image data in order to display a dynamic image of the background image and the desired character image on a preset display.

It may be arranged that the computer program is stored in a computer readable storage medium.

It should be noted that the program of the present invention may contain, depending on the cases, data, parameters, etc. necessary for processing images, other than the program necessary to make the computer function as an image processing apparatus.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

A preferred embodiment of the present invention will now be described in detail with reference accompanying drawings. It should be noted that the present embodiment will be explained in connection with the case of a game device which is equipped with the image processing device of the present invention.

Figure 1:
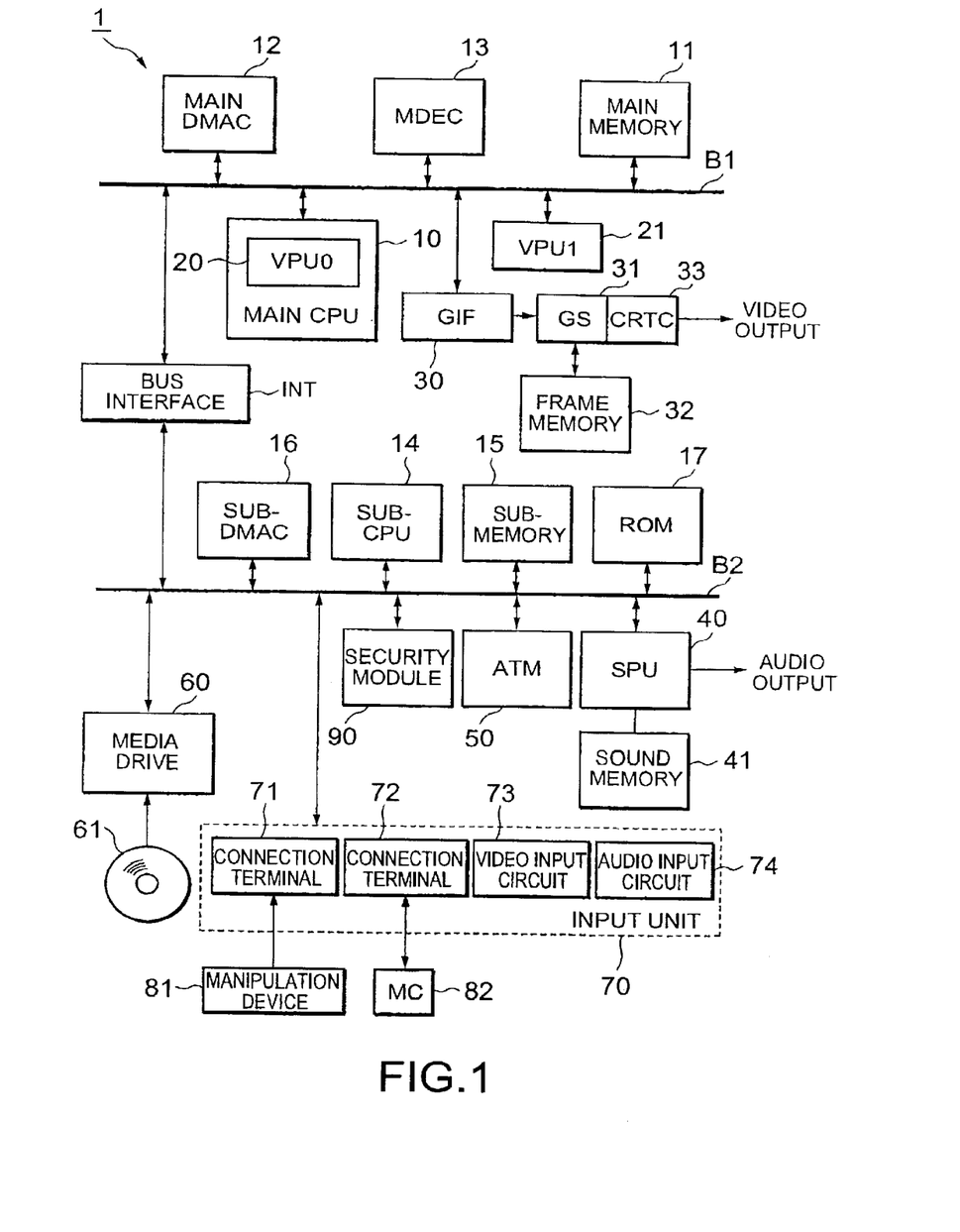
FIG. 1 is a diagram showing a hardware structure of a gate device according to a preferred embodiment of the present invention.

First, the game device of the embodiment will be described. The game device has such a hardware structure as shown in FIG. 1.

As shown in the figure, the game device has two busses, namely, main bus B1 and sub-bus B2. The busses B1 and B2 are connected to or separated from each other via a bus interface INT.

To the main bus B1, a main CPU (central processing unit) 10 including a micro processor and a first vector processing unit (VPU) 0 (to be called first VPU hereinafter), a main memory 11 including a RAM (random access memory), a main DMAC (direct memory access controller) 12, an MPEG (moving picture experts group) decoder (MDEC) 13, a second vector processing unit (VPU1) 21 (to be called second VPU hereinafter), and a GIF (graphical synthesizer interface) 30 serving as an arbiter for the first VPU 20 and second VPU 21 are connected. Further, a graphical synthesizer (to be called GS hereinafter) 31 is connected to the bus via the GIF 30. To the GS 31, a CRTC (CRT controller) 33 for generating a video output signal is connected.

The CRTC 33 is connected to a predetermined display device for displaying the game image, which is, for example, a television receiver. Note that the display device is not illustrated in the figure.

When the game device is started, the main CPU 10 reads a start-up program from a ROM 17 on the sub-bus B2 via a bus interface INT, and executes the start-up program to activate the operating system. Then, the application program and data are read from a medium 61 by controlling a media drive 60, and they are stored in the main memory 11. Further, the main CPU 10 carries out a geometry process on various data read from the medium 61, that is, for example, three-dimensional object data consisting of a plurality of basic figures (polygons) (such as coordinate values of vertexes (representative points) of polygons), in cooperation with the first VPU 20.

The first VPU 20 has a plurality of operating elements each for calculating a real number of a floating point, with the operating elements, the floating point calculations are carried out in parallel. More specifically, the main CPU 10 and the first VPU 20 carry out calculation processes which require fine operations in units of polygons in the geometry process. Thus, a display list having contents of polygon definition data such as vertex coordinate matrix and shading mode data obtained by the calculation processes.

The polygon definition data contains graphical region setting data and polygon data. The graphical region setting data contains an offset coordinate in a frame buffer address of the graphical region, and a coordinate of a graphical clipping region for canceling a graphical image when the coordinate of a polygon is located outside the graphical region. The polygon data contains polygon attribute data and vertex data. The polygon attribute data are used to designate a shading mode, an α-blending mode, a texture mapping mode, etc., and the vertex data are those of a coordinate within a vertex graphical region, a coordinate within a vertex texture region, a color of a vertex, etc.

As in the case of the first VPU 20, the second VPU 21 has a plurality of operating elements each for calculating a real number of a floating point, with the operating elements, the floating point calculations are carried out in parallel. Thus, a display list having contents of data used for generating an image by operating a manipulation device 81 and a matrix, that is, for example, relatively simple two-dimensional polygon definition data which can be generated by processes such as perspective conversion, parallel light source calculation and two-dimensional curved surface generation.

As described above, the first VPU 20 is the same in structure as the second VPU 21; however they function geometry engines which take parts of calculation process of different contents. Usually, such a process (non-routine geometry process) of movement of a character, which requires the calculation of a complicated behavior, is assigned to the first VPU 20, whereas such a process (routine geometry process) of an object, for example, a building in a background, which requires a simple operation, but calculation of a great number of polygons, is assigned to the second VPU 21.

The first VPU 20 carries out a macro calculation process which is synchronous with a video rate, and the second VPU 21 is set to operate in synchronism with the GS 31. For this operation, the second VPU 21 has a direct path directly connected to the GS 31. On the other hand, the first VPU 20 is tightly connected to a microprocessor in the main CPU 10 so as to facilitate the programming of a complicated process.

The first VPU 20 and the second VPU 21 each display a display list. Each generated display list is transferred to the GC 31 via the GIF 30.

The GIF 30 serves as an arbiter such that display lists generated by the first VPU 20 and second VPU 21 do not collide with each other while transferred to the GS 31. In this embodiment, the GIF 30 has an additional function of examining display lists in the order of priority, and transferring them to the GS 31 from the highest priority. The data indicating the priority of a display list is written in its tag region usually when the display list is generated from either one of the VPUs 20 and 21, but it may be determined by the GIF 30 by itself.

The GS 31 holds graphical contexts, and reads a corresponding graphical context on the basis of the identification data of image contexts contained in a display list notified from the GIF 30. Then, with use of the graphical context, a rendering process is carried out and thus a polygon is drawn in a frame buffer 32. The frame memory 32 can be used as a texture memory as well, and therefore a pixel image on the frame memory can be pasted as a texture onto a polygon to be drawn.

Back to FIG. 1, the main DMAC 12 subjects each of the circuits connected to the main bus B1 to DMA transfer control, and subjects each of the circuits connected to the sub-bus B2 to DMA transfer control, on the basis of the status of the bus interface INT.

The MDEC 13 operates in parallel with the main CPU 10, and expands data compressed by the MPEG (moving picture experts group) mode, JPEG (joint photographic experts group) mode or the like.

To the sub-bus B2, a sub-CPU 12 including a microprocessor, etc., a sub-memory 15 including an RAM, a ROM 17 which stores programs including that of the operating system, a sound processing unit (SPU) 40 for reading sound data stored in a sound memory 41 and outputting it as an audio output, a communication control unit (ATM) 50 for transmitting/receiving data via a public communication line or the like, a media drive 60 on which a recording medium 61 such as a CD-ROM or DVD-ROM, and an input unit 70 are connected. The input unit 70 includes a connection terminal 71 to which the manipulation device 81 is connected, a connection terminal 72 to be connected with a memory card MC, a video input circuit 73 for inputting image data from an external device and an audio input circuit 74 for inputting sound data from an external device The sub-CPU 14 carries out various operations in compliance with programs stored in the ROM 17. The sub-DMAC 16 subjects each of the circuits connected to the sub-bus B2 to controls including DMA transfer only when the main bus B1 and the sub-bus B2 are separated from each other by the bus interface INT.

The game device of the embodiment carries out a geometry process. As described, it becomes possible to achieve a geometry process applicable to a high-speed rendering process by operating the first VPU 20 and second VPU 21 in parallel. In this process, whether the result of the calculation process by the first VPU 20 should be sent directly to the GIG 30 or sent in serial via the second VPU 21 is selected by means of software. The former mode is called parallel connection, and the latter mode is called serial connection. In both of the modes, an output terminal of the second VPU 21 has a path connected directly to the GIF 30 (GS31), and the coordinate conversion is carried out in synchronism with the timing of the rendering process of the GS 31.

In the game device having the above-described structure, when the power is turned on or the operation is reset while the recording medium 61 of the present invention, which is in the form of, for example, CD-ROM, is set on the media drive 60, the main CPU 10 executes an OS recorded on the ROM 17. When the OS is executed, the main CPU 10 initializes the entire operation of the device so as to, for example, check the operation, and controls the media drive 60 to read the program recorded on the CD-ROM 61 to the main memory 13 and execute the program. As the game program is executed, the main CPU 10 forms such a functional block as shown in FIG. 2, and thus the game device according to the present invention is realized.

It should be noted that the above-described CD-ROM 61 corresponds to an example of the recording medium of the present invention. Further, the program recorded in the ROM corresponds to an example of the program of the present invention.

This program may be of a type for making a computer to function as a game device of the present invention by simply reading the program. Further, as described above, it may be of a type for making the computer to function as a game device in cooperation with the OS held by the computer.

Figure 2:
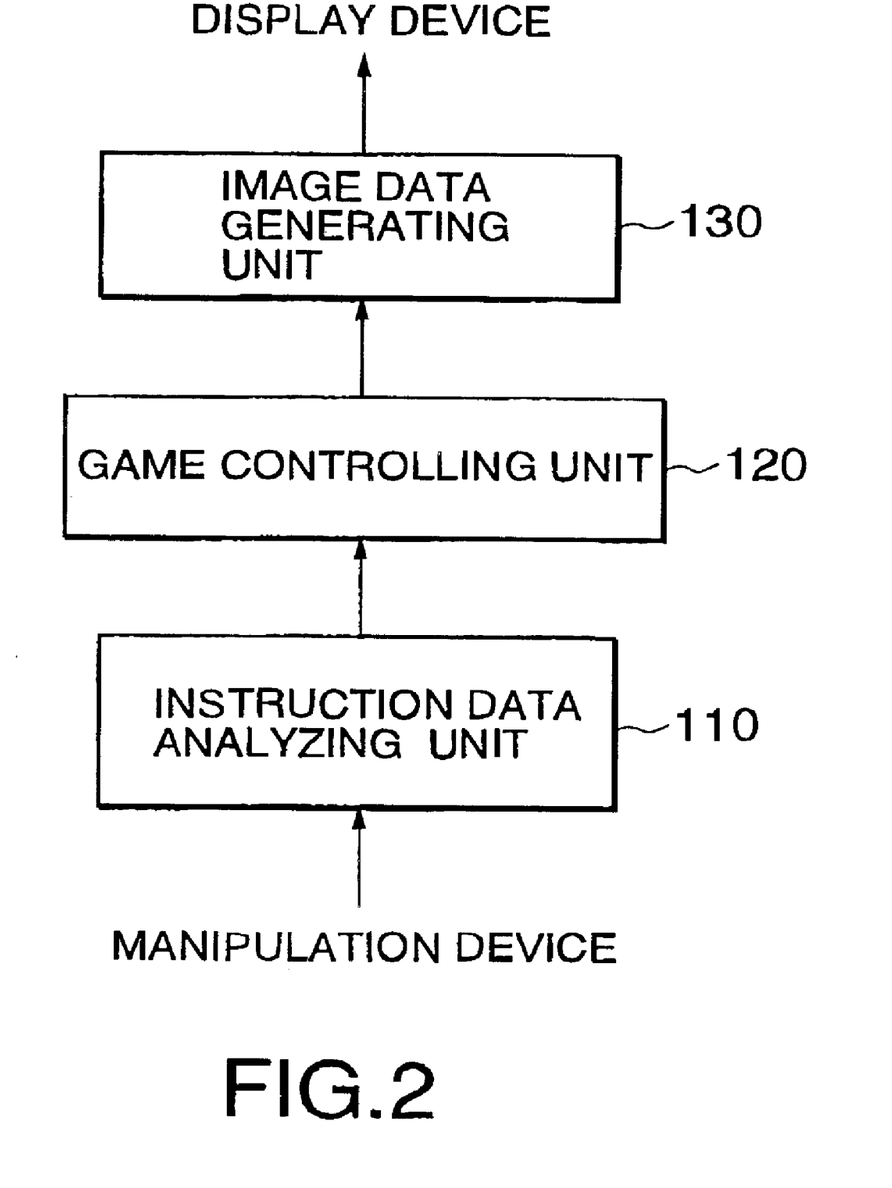
FIG. 2 is a functional block diagram showing an example of the structure of the game device shown in FIG. 1.

As shown in FIG. 2, the game device of the embodiment includes an instruction data analyzing unit 110, a game controlling unit 120 and an image data generating unit 130 in its structure.

The instruction data analyzing unit 110 is connected to the manipulation device 81, and serves to identify the contents of an operation input from the manipulation device 81 by the player of the game. The operation contents analyzed by the instruction data analyzing unit 110 are sent to the game controlling unit 120, and thus they are reflected in the control of the execution of the game.

The game controlling unit 120 serves to comprehensively control the entire game executed by the present invention.

It should be noted that the game executed by the game device of the present invention is a car rally game. In the rally game executed by the game device, a car is driven on a predetermined road by the player through the manipulation device 81, so as to compete with some other car in terms of ranking or time.

The data generated by the game controlling unit 120 is sent to the image data generating unit 130, and it is reflected in the generation of an image displayed on the display device. That is, the game controlling unit 120 determines an image to be displayed on the display device, and renders the image data generating unit 130 to generate the data used to display the image obtained on the basis of the determination, on the display device.

The image data generating unit 130 is designed to generate image data for displaying a desired image on the display device.

Figure 3:
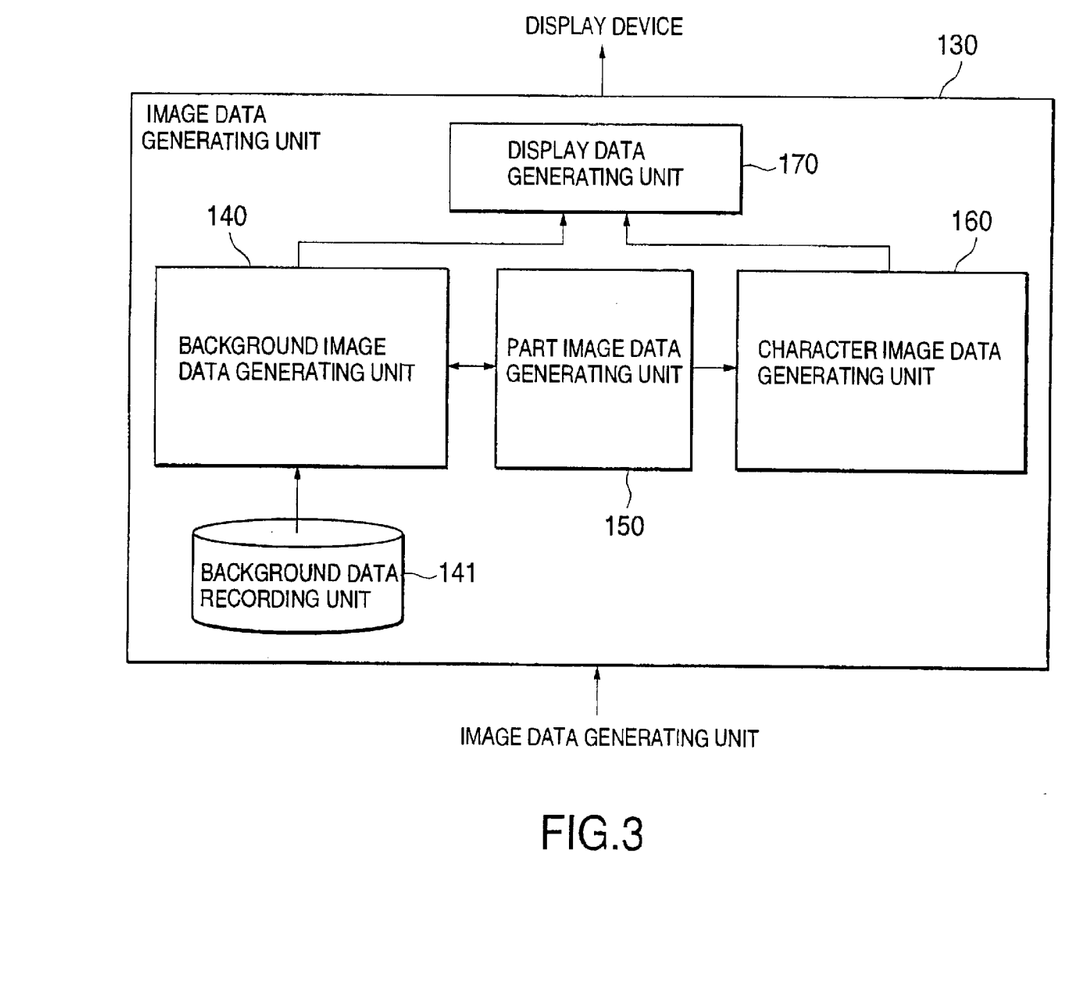
FIG. 3 is a functional block diagram showing details of an image data generating unit shown in FIG. 2.

As shown in FIG. 3, the image data generating unit 130 includes a background image data generating unit 140, a background data recording unit 141, a part image data generating unit 150, a character image data generating unit 160 and a display data generating unit 170 in its structure.

The background image data generating unit 140 is designed to generate background data of a background image.

The background image data recording unit 141 is designed to store the background data of the background image. Since this game device is of a car rally game, the background image data recording unit 141 stores background data for the background scene including a road, sky, buildings and trees around the road.

The background image data generating unit 140 reads the background data from the background image data recording unit 141 in compliance with an instruction from the game controlling unit 120, and generates the background image data. The background image data is sent to the display data generating unit 170 and the part image data generating unit 150.

The part image data generating unit 150 is designed to generate the part image data for the part image obtained by extracting a part of the background image.

It should be noted that the present invention is not limited to this embodiment, but in this embodiment, a part image consists of a plurality of sub-part images; therefore the part image data generating unit 150 is designed to generate part image data containing sub-part image data for a plurality of sub-part images obtained by extracting a part of the background image.

In this embodiment, the part image (consisting of sub-part images) is extracted appropriately from the surrounding of the background image, but detailed descriptions for the extracting procedure will be omitted here.

The character image data generating unit 160 is designed to generate character image data. In more detail, character image data of a character image in which a part image based on part image data is pasted on its reflection portion, is generated.

A character is a predetermined image displayed as it is superimposed on the background image on the scene displayed on the display. A car rally game is executed by the game device of the present invention, character images such as cars are generated here. Further, a character has, at least as its part, a reflection portion on which the background is reflected. In this embodiment, the character is a car, and the windows of the car, that is, the front window, rear window and both right and left side windows, are reflection portions.

Figure 4:
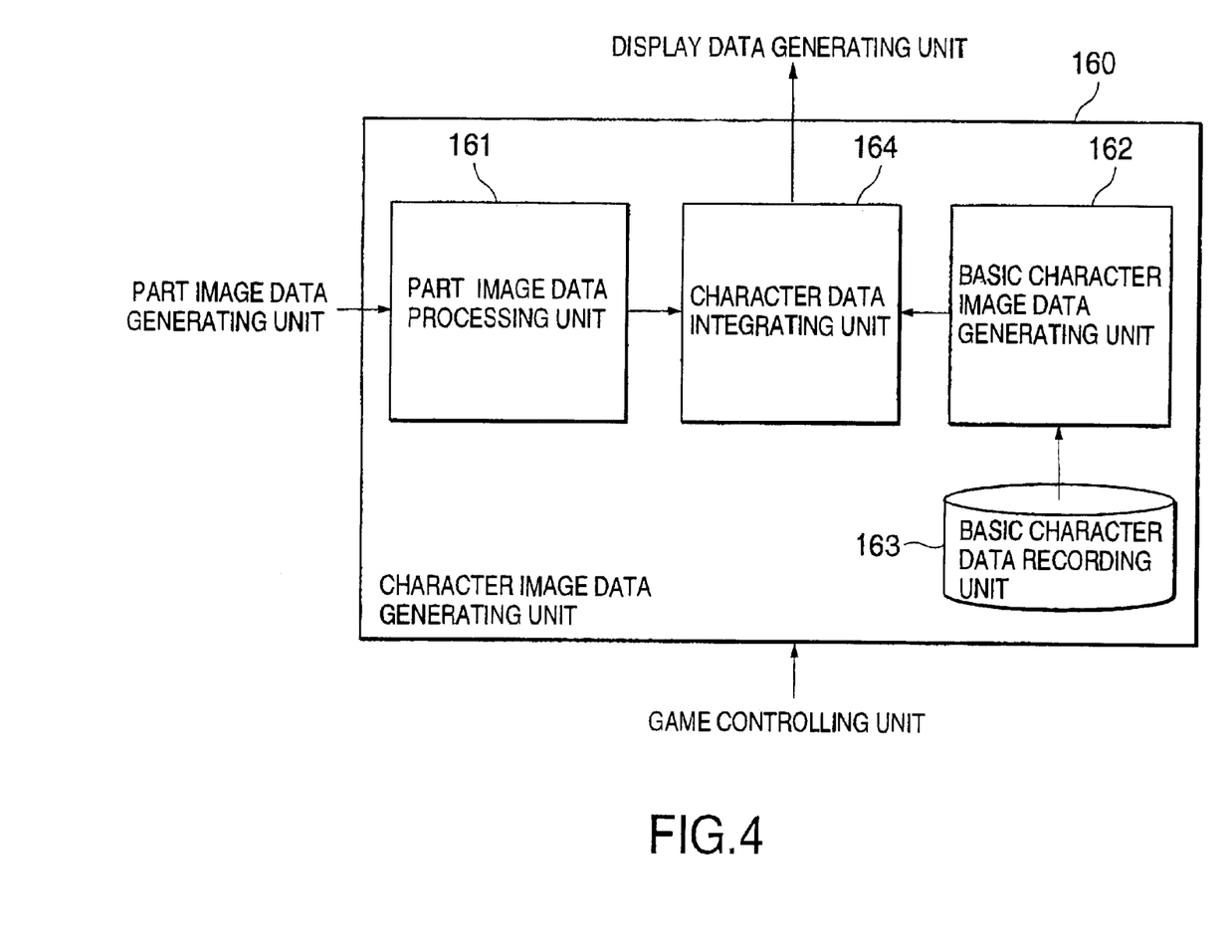
FIG. 4 is a functional block diagram showing details of a character image data generating unit shown in FIG. 3.

In more detail, the character image data generating unit 160 includes a part image data processing unit 161, a basic character data generating unit 162, a basic character data recording unit 163 and a character data integrating unit 164 in its structure.

The part image data processing unit 161 receives part image data from the part image data generating unit 150, and carries out various processes on the data. Although it is not limited to this, the part image data processing unit 161 of this embodiment subjects the part image data to a process where a predetermined sub-part image is turned upside down. Further, in this embodiment, the part image data processing unit 161 serves to decrease the brightness of a predetermined one of the sub-part images based on the part image data, or make it semi-transparent.

Which one of the sub-part images is subjected to the turning of image upside down, decreasing the brightness of it or making it semi-transparent, is determined in accordance with the data sent from the game controlling unit 120. There are some cases where two or more of these three processing variations are carried out on the part image data.

The part image data subjected to necessary processes as above in the part image data processing unit 161 is then sent to the character data integrating unit 164.

The basic character image data generating unit 162 is designed to generate basic data of a character image, more specifically, basic character image data for a character image of a portion excluding a part image.

The basic character data recording unit stores basic data for the character, that is, basic character image of the character of the portion excluding the part image. The character of the car in this embodiment, is drawn with use of polygons, and therefore the data for a wire frame necessary for drawing the character of the car with the polygons, the data for the texture pasted onto the wire frame and data regarding how to paint it, etc. are stored in the basis character data recording unit 163.

The basic character image data generating unit 162 reads basic character data from the basic character data recording unit 163 in accordance with an instruction from the game controlling unit 120, and generates the above-described basic character image data.

The basic character image data is then sent to the character data integrating unit 164.

The character data integrating unit 164 receives part image data from the part image data processing unit 161 and basic character image data from the basic character image data generating unit 162, and integrates them together to generate character image data of a character image in which the part image is pasted on its reflection portion. The character image data is then sent to the display data generating unit 170 as already described.

The display data generating unit 170 generates dynamic image data used for controlling a dynamic image displayed on the display device, from the background image data sent from the background image data generating unit 140 and the character image data sent from the character image data generating unit 160. The dynamic image displayed on the display device on the basis of the dynamic image data contains the background image and the character image superimposed on the background image.

Next, an example of the image processing method of the present invention will now be described by illustrating the operation of the above-described game device.

In the game device, when the power is turned on or the operation is reset, and then the player inputs the operation contents for starting the game to the device via the manipulation device 81, the car rally game is started.

More specifically, the operation contents input via the manipulation device 81 for starting the game, are transmitted to the game controlling unit 120 via the instruction data analyzing unit 110. Then, as the game controlling unit 120 carries out a process for starting the game, and thus the rally game is started.

It should be noted that the image data generating unit 130 generates image data necessary to display images such as a demo picture and a game mode selection menu to be displayed on the display device under the control of the game controlling unit 120 before starting the game. The display device displays a demo image, the game mode menu, etc.

When the rally game is started, the dynamic image including the background image and character image is displayed on the display device.

Figure 5:
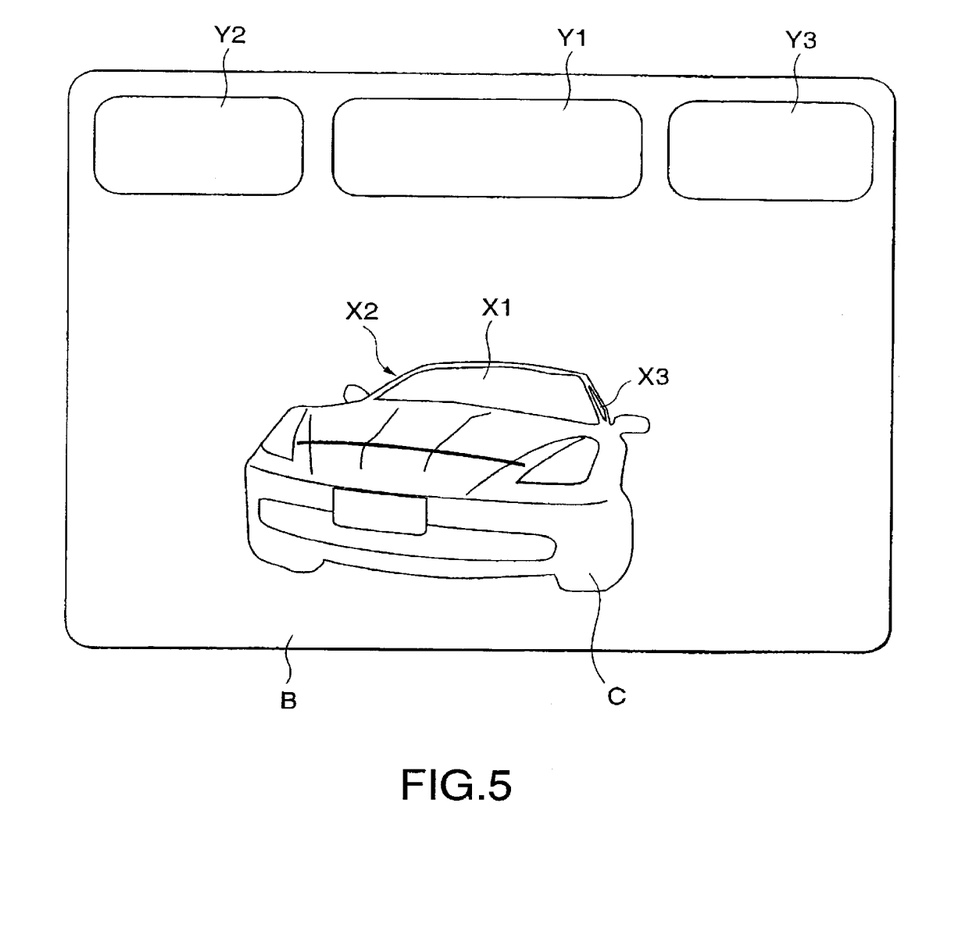
FIG. 5 is a diagram illustrating an example of a dynamic image displayed on a display device by the game device shown in FIG. 1.
Figure 6:
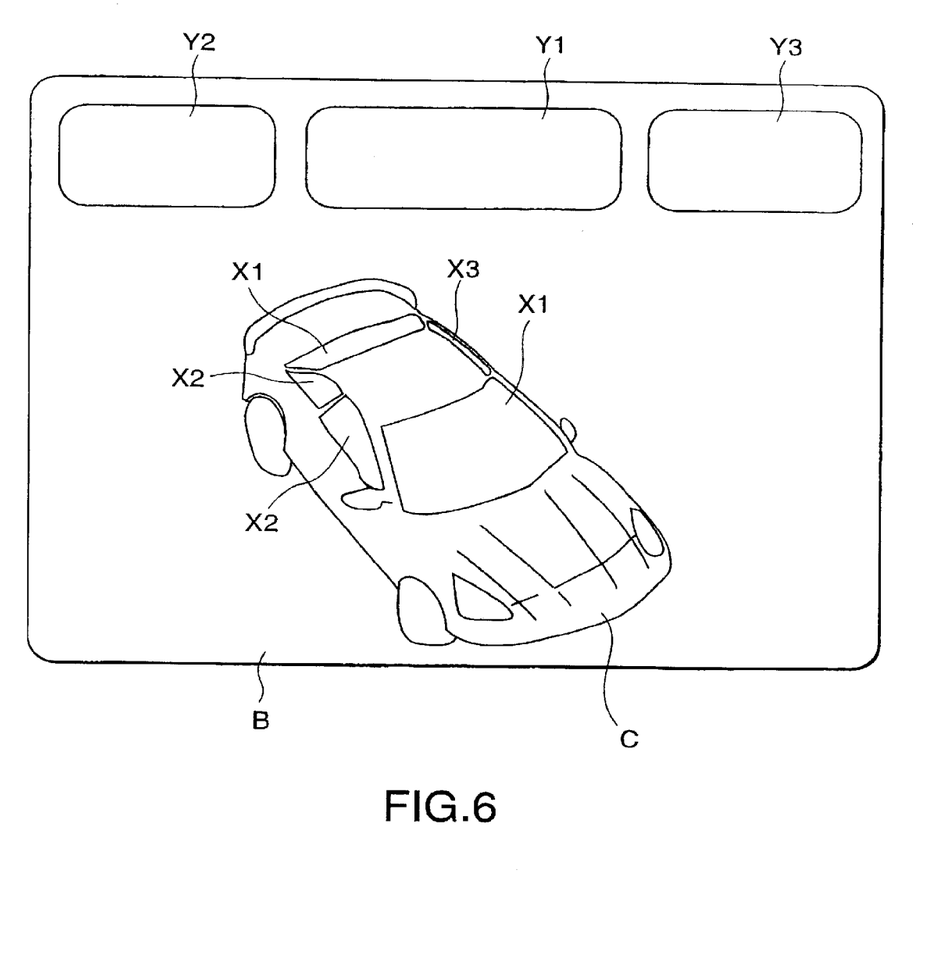
FIG. 6 is a diagram illustrating an example of a dynamic image displayed on a display device by the game device shown in FIG. 1.

For example, such images shown in FIGS. 5 and 6 are displayed on the display device, FIG. 5 is an example of the image of the character, that is, a car, when it is viewed from the point diagonally above, and FIG. 6 is an example of the image of the character, that is, a car, when it is observed from substantially a horizontal view point. These pictures can be switched over by selecting a different game mode or by an instruction input from the player. This switching control is carried out by the game controlling unit 120.

In each of FIGS. 5 and 6, B represents the background image and C represents a character image. Each of X1, X2 and X3 represents a sub-reflection portion and each of Y1, Y2 and Y3 represents a sub-part image. Here, a sub-reflection portion X1 corresponds to a front window and rear window of the car 1, X2 corresponds to a right side window, and X3 corresponds to a left side window. At this instantaneous moment, the sub-reflection portions X1, X2 and X3 correspond to the sub-part images Y1, Y2 and Y3, respectively.

It should be noted that a road, buildings, trees, etc, are drawn in the background image in an actual game, but they are omitted from this figure for simplification.

A moving picture is displayed on the display device in the following manner.

First, the game controlling unit 120 determines an image to be displayed on the display device in accordance with an input from the manipulation 81 by the player or a change in status which is judged in accordance with predetermined data, and sends this data to the image data generating unit 130.

The image data generating unit 130 generates dynamic image data on the basis of the data.

More specifically, the dynamic image data is generated by the display data generating unit 170 on the basis of the background image data and character image data generated by the background image data generating unit 140 and character image data generating unit 160, respectively.

The background image data generating unit 140 reads desired background data from the background image data recording unit 141 in compliance with the data from the game controlling unit 120, and generates the background image data on the basis of thus read data. The background image is expressed as dynamic image which changes continuously from second to second as the car travels as being driven.

The background image data generating unit 140 sends the background image data to the display data generating unit 170 and part image data generating unit 150.

The part image data generating unit 150 generates part image data. In this example, the part image data generating unit 150 generates the part image data containing data of the sub-part images Y1 to Y3.

In this example, the part image data generating unit 150 generates part image data of the sub-part images Y1 to Y3. Here, the relative positions in the left to right direction of the sub-part images Y1 to Y3 on the display device are made to match with the relative positions in the left to right direction of the sub-reflection portions X1 to X3 on the display device.

Each of the sub-part images Y1 to Y3 is extracted from a section of the background image, which is located above the car C.

It should be noted that the extraction of the sub-part images Y1 to Y3 can be performed by some other method than that described above. For example, a plurality of sub-par images Y1 to Y3 may be extracted from sections of the background image B, which are located at positions corresponding to normal vectors of sub-reflection portions X1 to X3, respectively. More specifically, each of the sub-part images can be extracted from a respective section of the background image B, which is located on an extension line of its normal vector.

The part image data containing the data of the sub-part images X1 to X3 are sent to the character image data generating unit 160.

The character image data generating unit 160 generates character data.

First, the basic character data generating unit 162 reads basic character data from the basic character data recording unit 163 on the basis of the data from the gate control unit 120, and generates character image data excluding a portion of the part image on the basis of the basic character data. In this example, the basic character data generating unit 162 generates basic character image data of the car C.

The basic character image data is sent to the character data integrating unit 164.

On the other hand, the part image data processing unit 161 carries out a necessary process on the part image data in accordance with the data from the game controlling unit.

For example, in the example shown in FIG. 5, only the sub-part image Y1 corresponding to the sub-reflection portion X1 for the front window and rear window is turned upside down.

In the example shown in FIG. 6, all of the sub-part images Y1–Y3 corresponding to the sub-reflection portion X1 for the front window and rear window, the sub-reflection portion X2 for the left side window and the sub-reflection portion X3 for the right side window, are turned upside down.

Further, if necessary, the part image data processing unit 161 decreases the brightness of a predetermined one of the sub-part images based on the part image data, or makes it semi-transparent.

The character data integrating unit 164 generates the character image data of the character image in which the part images Y1 to Y3 are pasted on the respective sub-reflection portions X1 to X3, which is obtained by integrating the basic character image data from the basic character image data generating unit 162 and the part image data from the part image data processing unit 161.

In the case where the part image data contains a sub-part image which has been made semitransparent, the sub-part image is superimposed, by pasting, on the image drawn in advance in the respective part-reflection portion.

The character image data thus formed is sent to the display data generating unit 170.

Then, the display data generating unit 170 generates dynamic image data on the basis of the background image data from the background image data generating unit 140 and the character image data from the character image data generating unit 160.

The dynamic image data is sent to the display device. On the basis of this dynamic image data, a desired dynamic image is displayed on the display device.

As the rally game proceeds and certain conditions such as the car C driven by the player reaching a goal, are satisfied, the game is finished.

In the embodiment described above, it is described that the sub-reflection portions X1, X2 and X3 correspond to the sub-part images Y1, Y2 and Y3; however it is the case of the image at an instantaneous moment shown in FIG. 5 or FIG. 6. That is, when the character image of the car C changes, the above-described correspondence finishes, and a new relationship between the sub-reflection portions X1, X2 and X3 and sub-part images Y1, Y2 and Y3, respectively corresponding to each other, is created. That is, in order to display a scene where the car C slips as its wheels spin or the car C is displayed on the display device from the back as the viewpoint is switched, X1 corresponds Y1, X2 to Y3 and X3 to Y2. The relationship of the correspondence described above can be changed by, for example, the part image data generating unit 150. On the basis of the data for the correspondence between the sub-reflection parts X1, X2 and X3 and the sub-part images Y1, Y2 and Y3, respectively, at the instantaneous point, the part image data generating unit 150 generates the part image data containing the data of the sub-part image.

It should be noted that the above-described image display method can be practiced without detecting the change in the correspondence relationship. Such a method will now be described briefly.

That is, in order to practice the image display method without detecting the correspondence relationship, the correspondence between a sub-part image and a sub-reflection portion is fixed, and the correspondence between these is kept at all times.

Figure 7:
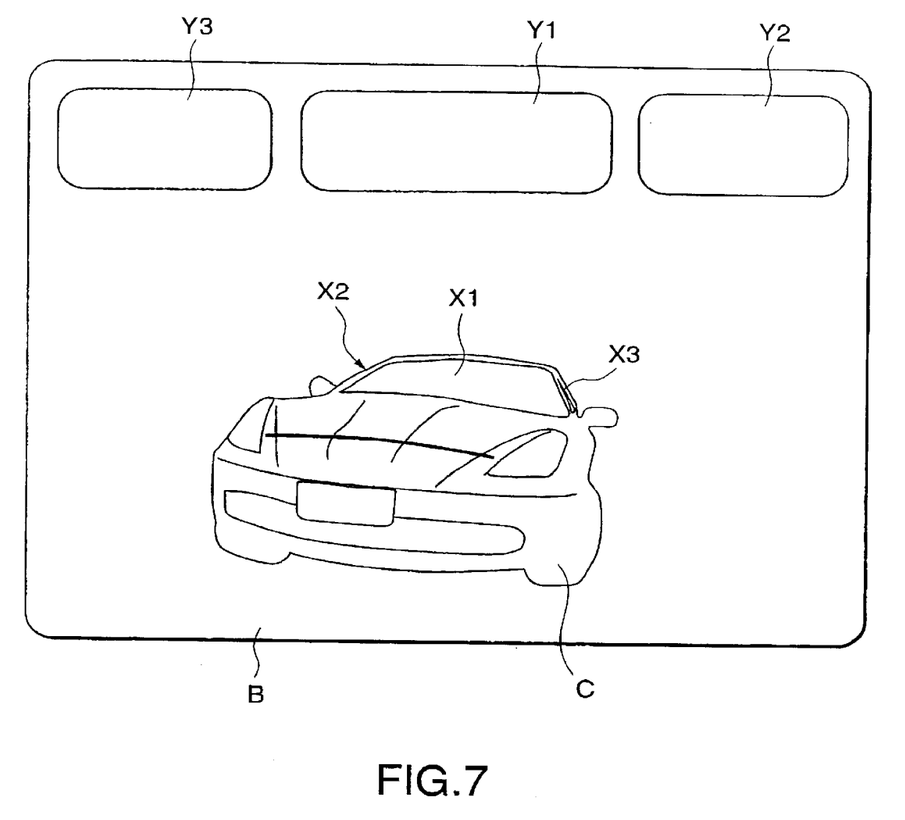
FIG. 7 is a diagram illustrating another example of a dynamic image displayed on a display device by the gate device shown in FIG. 1.

For example, here it suffices only if such sub-part images X1, X2 and X3 and sub-reflection portions Y1, Y2 and Y3 as shown in FIG. 7 are fixated in terms of their corresponding relationships. In this example, the sub-reflection portion X1 corresponds to the front window and rear window of the car C, the sub-reflection portion X2 corresponds to the right side window and the sub-reflection portion X3 corresponds to the left side window. The sub-reflection portions X1, X2 and X3 correspond to the sub-part images Y1, Y2 and Y3, respectively. The correspondence relationships here are fixated, and they do not change even when the car C is displayed on the display device from various viewpoints from different directions such as from the back or from a side.

Thus, when the correspondence relationships between the sub-reflection portions X1, X2 and X3 and the sub-part images Y1, Y2 and Y3, respectively are kept at all times, it suffices if the part image data generating unit 150 generates part image data in compliance with the correspondence relationships.

As described above, according to the present invention, a highly real reflection portion can be displayed when a character having a reflection portion and a background scene are displayed on the display device. Further, according to the present invention, the load on the image processing device can be suppressed to a low level despite that a highly real reflection portion can be displayed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image processing method comprising the steps of:
   generating background image data of a background image;
   extracting part image data from the background image data, which corresponds to a part of the background image;
   generating base character image data of a desired character image including at least one reflection portion;
   generating composite character image data of the character image in which the part of the background image is pasted on the at least one reflection portion, using the base character image data and the extracted part image data; and
   generating dynamic image data according to the background image data and the composite character image data in order to display a dynamic image of the background image and the desired character image on a preset display.

2. The image processing method according to claim 1, wherein the composite character image data generating step includes a substep of executing at least one of coordinate inversion, brightness adjustment, and semitransparency processing, for the extracted part image data.

3. The image processing method according to claim 1, wherein the part of the background image positions above the desired character image on the displayed dynamic image.

4. The image processing method according to claim 1, wherein the desired character represents a three-dimensional shape, and the part of the background image positions in a direction of a normal vector of the at least one reflection portion.

5. The image processing method according to claim 1, wherein the desired character image includes a plurality of reflection portions, the part of the background image includes a plurality of sub-part images, and the composite character image data generating step generates composite character image data such that the plurality of sub-part images are pasted on the plurality of reflection portions respectively.

6. The image processing method according to claim 5, wherein the plurality of sub-part images position above the plurality of reflection portions on the displayed dynamic image.

7. The image processing method according to claim 5, wherein the desired character represents a three-dimensional shape, and the plurality of sub-part images position in directions of normal vectors of the plurality of reflection portions respectively.

8. The image processing method according to claim 5, wherein a relative position relationship of the plurality of reflection portions coincides with a relative position relationship of the plurality of sub-part images on the displayed dynamic image.

9. The image processing method according to claim 5, wherein a correspondence between the plurality of reflection portions and the plurality of sub-part images is kept in accordance with a preset condition.

10. The image processing method according to claim 1, wherein the desired character image represents a vehicle.

11. The image processing method according to claim 10, wherein the vehicle includes a plurality of reflection portions, the part of the background image includes a plurality of sub-part images, and the composite character image data generating step generates composite character image data such that the plurality of sub-part images are pasted on the plurality of reflection portions respectively.

12. The image processing method according to claim 11, wherein the plurality of reflection portions correspond to windows of the vehicle.

13. The image processing method according to claim 12, wherein the windows comprise a front window, a rear window and left and right side windows.

14. The image processing method according to claim 12, wherein the plurality of sub-part images position above the plurality of reflection portions on the displayed dynamic image.

15. The image processing method according to claim 12, wherein the desired character represents a three-dimensional shape, and the plurality of sub-part images position in directions of normal vectors of the plurality of reflection portions respectively.

16. The image processing method according to claim 12, wherein a relative position relationship of the plurality of reflection portions coincides with a relative position relationship of the plurality of sub-part images on the displayed dynamic image.

17. The image processing method according to claim 12, wherein a correspondence between the plurality of reflection portions and the plurality of sub-part images is kept in accordance with a preset condition.

18. An image processing apparatus comprising:

a first generator for generating background image data of a background image;

an extractor for extracting part image data from the background image data, which corresponds to a part of the background image;

a second generator for generating base character image data of a desired character image including at least one reflection portion, and generating composite character image data of the character image in which the part of the background image is pasted on the at least one reflection portion, using the base character image data and the extracted part image data; and a third generator for generating dynamic image data according to the background image data and the composite character image data in order to display a dynamic image of the background image and the desired character image on a preset display.

19. A storage medium having computer readable program code means embodied in the medium, the computer readable program code means comprising:

computer readable program code means for generating background image data of a background image;

computer readable program code means for extracting part image data from the background image data, which corresponds to a part of the background image;

computer readable program code means for generating base character image data of a desired character image including at least one reflection portion;

computer readable program code means for generating composite character image data of the character image in which the part of the background image is pasted on the at least one reflection portion, using the base character image data and the extracted part image data; and computer readable program code means for generating dynamic image data according to the background image data and the composite character image data in order to display a dynamic image of the background image and the desired character image on a preset display.

20. A computer program operational on a computer, comprising the steps of:

generating background image data of a background image;

extracting part image data from the background image data, which corresponds to a part of the background image;

generating base character image data of a desired character image including at least one reflection portion;

generating composite character image data of the character image in which the part of the background image is pasted on the at least one reflection portion, using the base character image data and the extracted part image data; and generating dynamic image data according to the background image data and the composite character image data in order to display a dynamic image of the background image and the desired character image on a preset display.

21. The computer program according to claim 20, wherein the computer program is stored in a computer readable storage medium.

* * * * *